(12) United States Patent
McCracken, Jr. et al.

(10) Patent No.: US 11,869,209 B1
(45) Date of Patent: Jan. 9, 2024

(54) HUMAN POSE IMAGE DATA BASED RETURNED GOODS PROCESSING SYSTEM AND RELATED METHODS

(71) Applicant: INMAR SUPPLY CHAIN SOLUTIONS, LLC, Winston-Salem, NC (US)

(72) Inventors: James W. McCracken, Jr., Lewisville, NC (US); Kenneth E. Bays, Lewisville, NC (US); Leonel Jerez, Pfafftown, NC (US); Mark Lingelbach, Winston-Salem, NC (US); Jason Wyatt, Advance, NC (US)

(73) Assignee: INMAR SUPPLY CHAIN SOLUTIONS, LLC, Winston-Salem, NC (US)

( * ) Notice: Subject to any disclaimer, the term of this patent is extended or adjusted under 35 U.S.C. 154(b) by 385 days.

(21) Appl. No.: 17/369,285

(22) Filed: Jul. 7, 2021

(51) Int. Cl.
| | |
|---|---|
| *G06T 7/70* | (2017.01) |
| *G06T 7/00* | (2017.01) |
| *G06Q 10/0837* | (2023.01) |
| *G06N 20/00* | (2019.01) |
| *G06V 40/20* | (2022.01) |
| *G06V 40/10* | (2022.01) |
| *G06F 18/22* | (2023.01) |

(52) U.S. Cl.
CPC ............... *G06T 7/70* (2017.01); *G06F 18/22* (2023.01); *G06N 20/00* (2019.01); *G06Q 10/0837* (2013.01); *G06T 7/0002* (2013.01); *G06V 40/103* (2022.01); *G06V 40/20* (2022.01); *G06T 2207/20081* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS 9,996,981 B1    6/2018 Tran et al.

OTHER PUBLICATIONS

Grab: Fast and Accurate Sensor Processing for Cashier-Free Shopping. Liu et al. (Year: 2020).*

* cited by examiner

*Primary Examiner* — Delomia L Gilliard
(74) *Attorney, Agent, or Firm* — ALLEN, DYER, DOPPELT + GILCHRIST, P.A. Attorneys at Law

(57) ABSTRACT

A returned goods processing system may include a camera configured to acquire human pose image data of a given user while processing a returned item. The system may also include a returned goods processing server configured to store reference human pose image data of sample users while processing returned items. The stored human pose image data may be indicative of compliance with an acceptable return processing procedure. The returned good processing server may also be configured to compare the acquired human pose image data with the stored reference human pose image data to determine compliance with the acceptable return processing procedure, and generate a notification based upon the comparing. The returned goods processing server may also be configured to perform machine learning to update the stored reference human pose image data based upon the acquired human pose image data.

25 Claims, 5 Drawing Sheets

HUMAN POSE IMAGE DATA BASED RETURNED GOODS PROCESSING SYSTEM AND RELATED METHODS

TECHNICAL FIELD

The present embodiments are directed to the field of image processing, and more particularly, to processing returned goods based upon human pose image data and related methods.

BACKGROUND

Returning of a purchased item is part of the retail process. Returning of a purchased item to a retailer may involve, the purchaser taking the purchased item, mostly along with a receipt, back to the retailer in exchange for a refund, exchange, merchandise credit, etc. For online purchases, for example, returning of a purchased item may include requesting a return authorization from the retailer, repackaging the purchased item in a box or acceptable shipping container, affixing return shipping information to the box or container, and placing the box or container including the purchased item and return shipping information with the appropriate shipping provider.

From the retailer or merchant perspective, processing returns may consume a relatively large amount of resources. For example, a returned product may be used and/or damaged, which may make it unsuitable for resale within the retailer's sales channels. Multiple returns of the same product may be indicative of a product defect.

SUMMARY

A returned goods processing system may include a camera configured to acquire human pose image data of a given user while processing a returned item. The returned goods processing system may also include a returned goods processing server configured to store reference human pose image data of sample users while processing returned items. The stored human pose image data may be indicative of compliance with an acceptable return processing procedure. The returned goods processing server may also be configured to compare the acquired human pose image data with the stored reference human pose image data to determine compliance with the acceptable return processing procedure, and generate a notification based upon the comparing. The returned goods processing server may also be configured to perform machine learning to update the stored reference human pose image data based upon the acquired human pose image data.

The returned item may include a returned garment, for example. The stored reference human pose image data may correspond to human poses for at least one of folding the returned garment, counting fasteners on the returned garment, visually inspecting the returned garment, and coupling a hang tag to the returned garment.

The acquired human pose image data may include limb joint movement data, for example. The returned goods processing server may be configured to compare the acquired human pose image data with the stored reference human pose image data based upon an articulated body pose estimation model.

The human pose image data comprises three dimensional human body pose data, for example. The returned goods processing server may be configured to communicate the notification to a remote device, for example. The notification may include a percentage of compliance.

A method aspect is directed to a method of processing returned goods. The method may include using a returned goods processing server to obtain human pose image data acquired from a camera while processing a returned item, and store reference human pose image data of sample users while processing returned items. The stored human pose image data may be indicative of compliance with an acceptable return processing procedure. The method may also include using the returned goods processing server to compare the acquired human pose image data with the stored reference human pose image data to determine compliance with the acceptable return processing procedure, and generate a notification based upon the comparing. The method may further include using the returned goods processing server to perform machine learning to update the stored reference human pose image data based upon the acquired human pose image data.

A computer readable medium aspect is directed to a non-transitory computer readable medium for processing returned goods. The non-transitory computer readable medium includes computer executable instructions that when executed by a processor cause the processor to perform operations. The operations may include obtaining human pose image data acquired from a camera while processing a returned item, and storing reference human pose image data of sample users while processing returned items. The stored human pose image data may be indicative of compliance with an acceptable return processing procedure. The operations may also include comparing the acquired human pose image data with the stored reference human pose image data to determine compliance with the acceptable return processing procedure. The operations may further include generating a notification based upon the comparing, and performing machine learning to update the stored reference human pose image data based upon the acquired human pose image data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
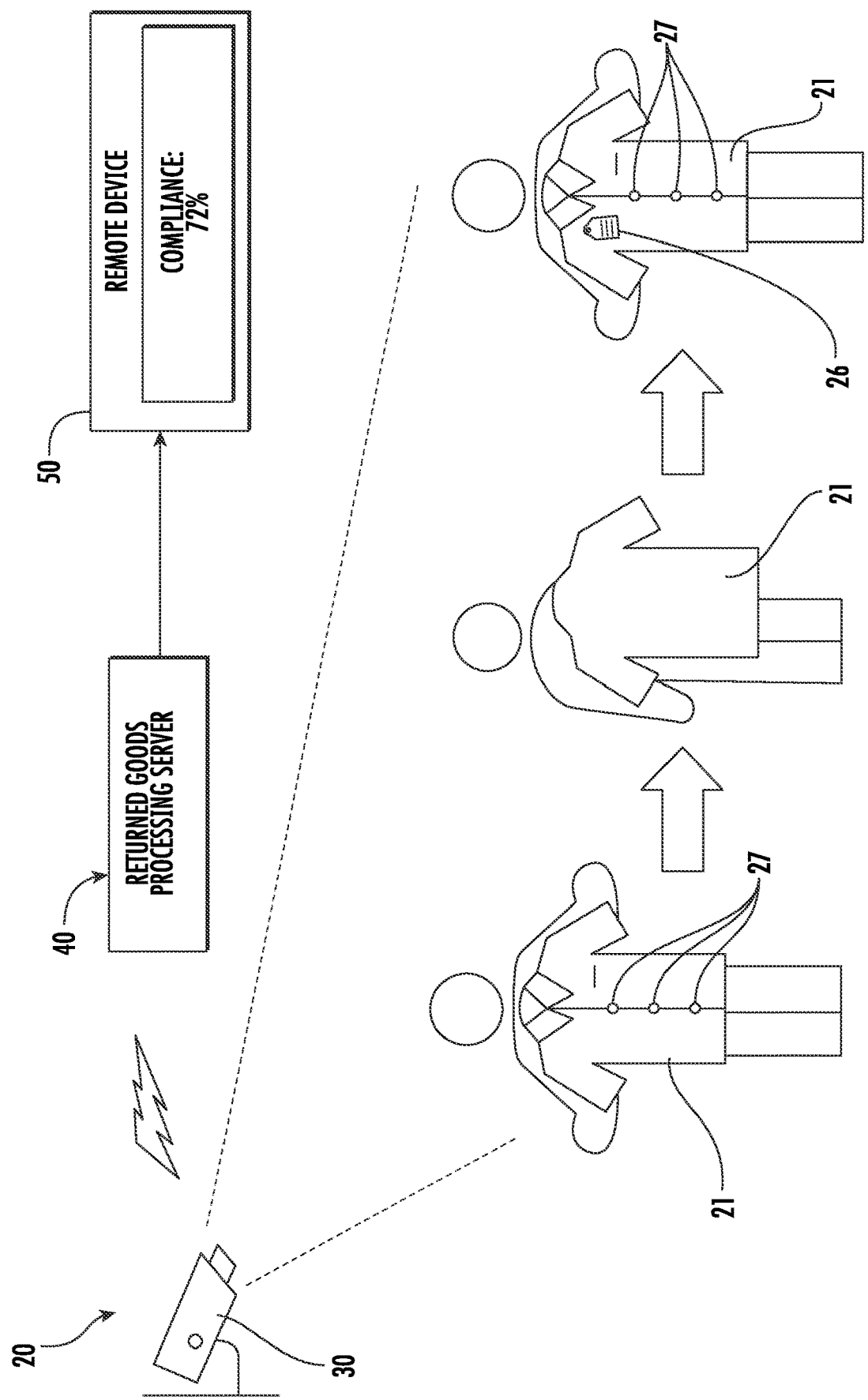
FIG. 1 is a schematic diagram of a returned goods processing system in accordance with an embodiment.
Figure 2:
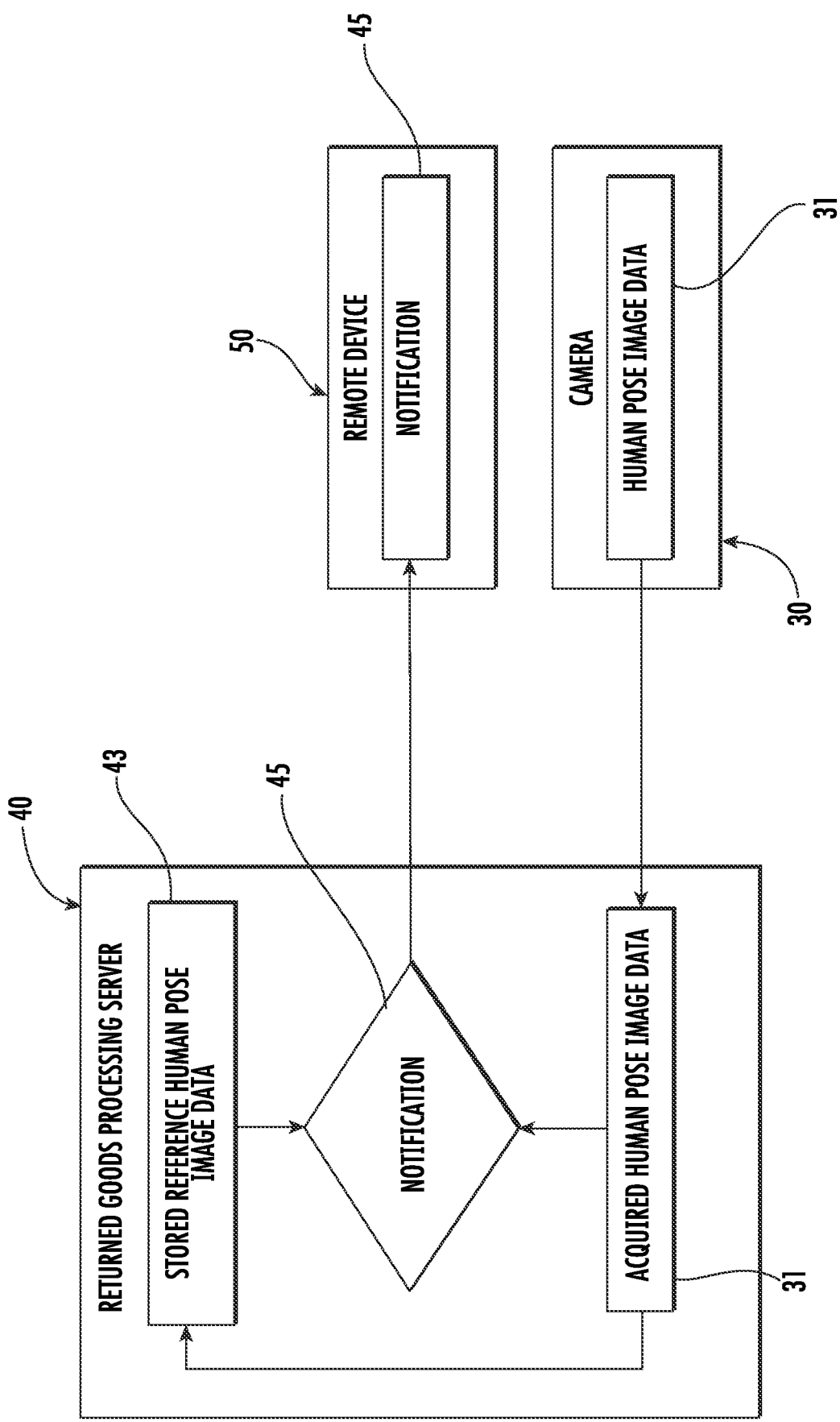
FIG. 2 is another schematic diagram of the returned goods processing system of FIG. 1.
Figure 3:
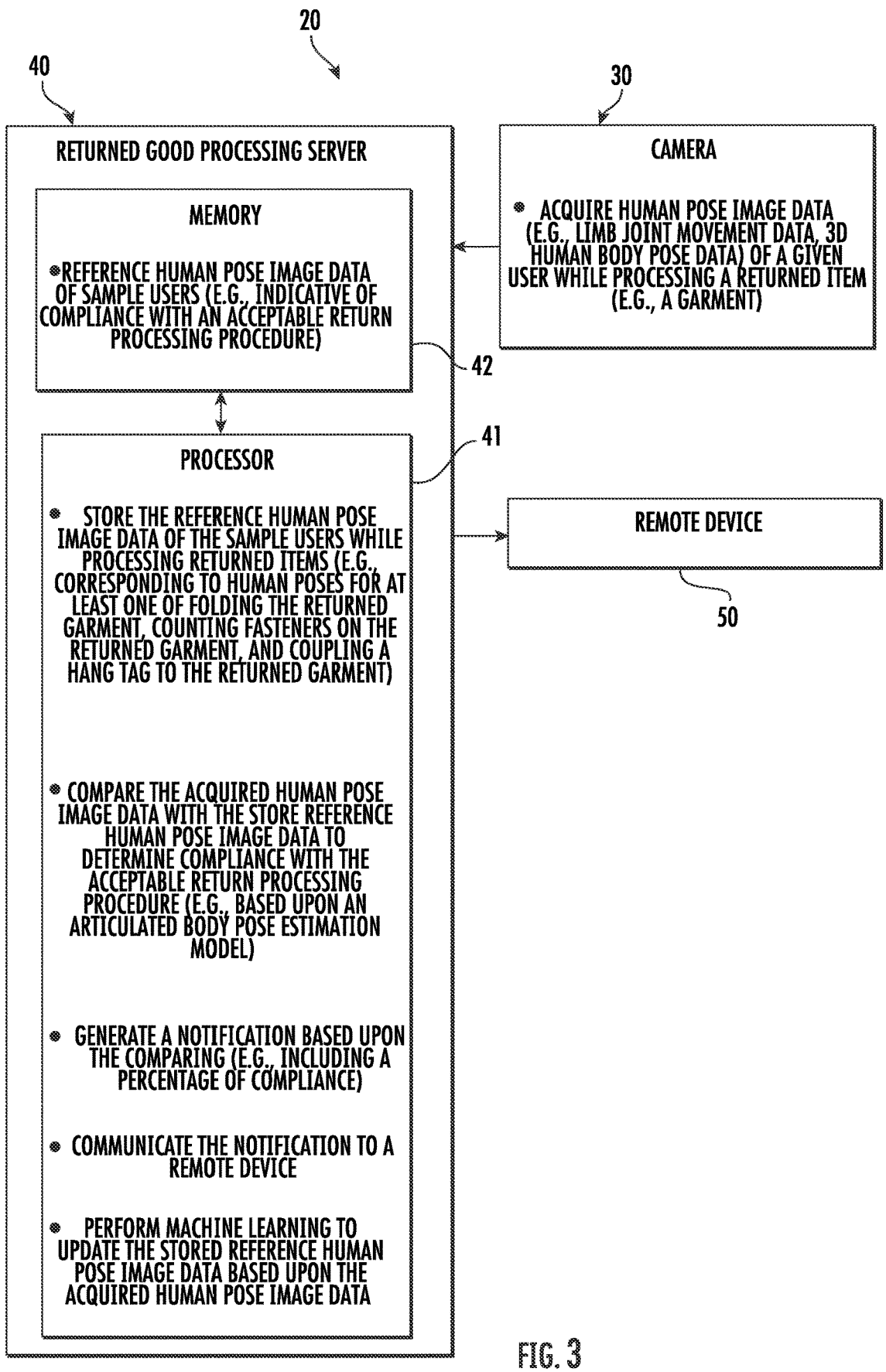
FIG. 3 is a schematic block diagram of the returned goods processing system of FIG. 1.

Referring initially to FIGS. 1-3, a returned goods processing system 20 includes a camera 30 configured to acquire human pose image data 31, for example, limb joint movement data, of a given user while processing a returned item 21, for example, a returned garment. The camera 30 may be positioned in a warehouse or returned goods processing center, for example, with a field of view that permits acquired image data (e.g., videos) to include human users processing returned goods. More particularly, the camera 30 may be positioned so that it can acquire image data of a user opening a package, analyzing the contents of the package, and performing of series or sequence of actions, for example, in accordance with an acceptable return processing procedure.

The camera 30 may acquire three dimensional (3D) human body pose data. The camera 30 may acquire any one or more of visible wavelength images, long-wave thermal infrared images, time-of-flight images, and laser range scanner images. Of course, the camera 30 may acquire other types of images.

While a single camera 30 is described herein, those skilled in the art will appreciate that there may be more than one camera, and human pose image data acquired from each camera may be aggregated or stitched together for analysis. Moreover, the camera 30 may be embodied in an electronic device. For example, the camera 30 may be carried by a housing of a mobile wireless communications device, such as, a mobile telephone, tablet computer, wearable computer or device, or other device that includes a display and mobile wireless communications circuitry.

The returned goods processing system 20 also includes a returned goods processing server 40. The returned goods processing server 40 includes a processor 41 and an associated memory 42. While operations of the returned goods processing server 40 are described herein, it should be understood that the operations are performed by way of cooperation between the processor 41 and the memory 42.

Figure 4:
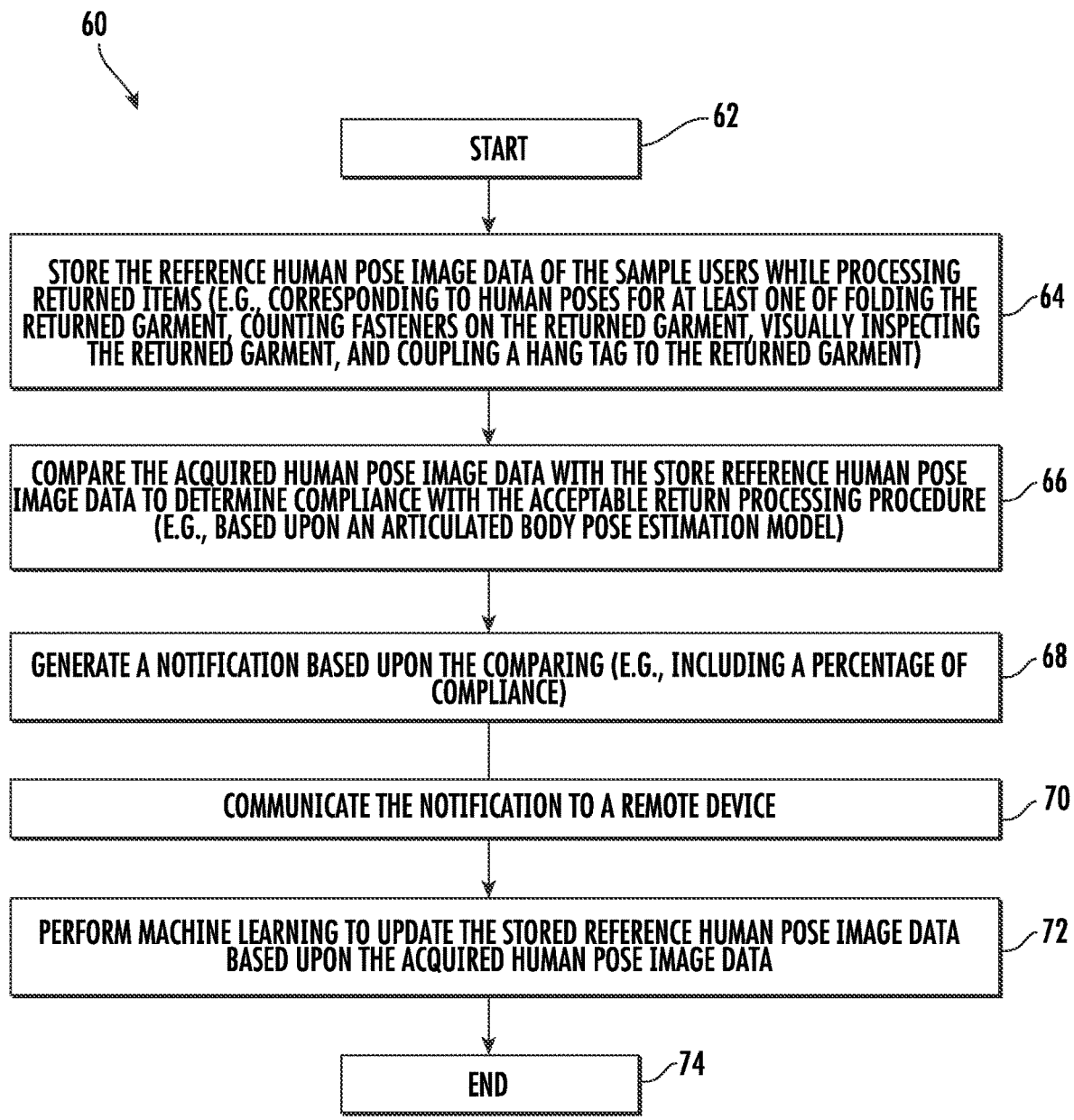
FIG. 4 is a flow diagram illustrating operation of the returned goods processing server of FIG. 3.

Referring now additionally to the flowchart 60 in FIG. 4, operations of the returned good processing server 40 will now be described with respect to processing returned goods. Beginning at Block 62, the returned goods processing server 40 stores, for example, in the memory 42, reference human pose image data 43 (e.g., 3D human body pose data) of sample users while processing returned items, for example, in the form of returned garments 21 (Block 64). The stored human pose image data 43 is indicative of compliance with an acceptable return processing procedure. More particularly, the stored reference human pose image data 43 corresponds to human poses for at least one of folding the returned garment 21, counting fasteners 27 on the returned garment, visually inspecting the returned garment, and coupling a hang tag 26 to the returned garment.

At Block 66, the returned goods processing server 40 compares the acquired human pose image data with the stored reference human pose image data to determine compliance with the acceptable return processing procedure. The returned goods processing server 40 may use computer vision and skeletal recognition techniques as a basis for the comparison. More particularly, the returned good processing server 40 may align the stored reference human pose data 43 and the acquired human pose image data 31 and determine, at a pixel level, whether there is a match to within a threshold. Using articulated body pose estimation techniques or models in computer vision, the returned goods processing server 40 applies algorithms that recover the pose of an articulated body, which includes joints and rigid parts using image-based observations.

Application of typical articulated body algorithms involves applying models in which the pose estimation is achieved by maximizing/minimizing a similarity/dissimilarity between the acquired human pose image data 31 and the stored reference human pose image data 43, as a template model. Based upon the acquired the human pose image data 31 from the camera, and the type of images acquired, the returned goods processing server 40 may produce intermediate representations of the acquired image data that are used by the model. The representations may include image appearance, voxel (volume element) reconstruction, 3D point clouds, a sum of Gaussian kernels, and 3D surface meshes, for example. Spatial gradients as a basis for generating a dissimilarity map may also be used, to determine differences or similarities between acquired and reference human pose image data 31, 43, as will be appreciated by those skilled in the art.

The returned goods processing server 40, as part of the comparison, determines whether acquired human pose image data 31 matches the reference human pose image data 43 to within a desired threshold indicative that the given user is or has performed motions corresponding to actions set forth with the acceptable return processing procedure. In other words, the returned goods processing server 40 determines that human body poses or motions acquired by the camera 30, when compared to the stored reference human body pose data, are indicative of the desired motions within the acceptable return processing procedure.

For example, if the acceptable return processing procedure includes folding the returned garment 21, counting fasteners 27 on the returned garment, visually inspecting the returned garment, obtaining a scent of the returned garment, and coupling a hang tag 26 to the returned garment 21, the returned goods processing server 40 analyzes the acquired human pose image data 31 against the stored reference human pose image data 43 to determine that the given user is performing those return procedures. If the comparison between the acquired human pose image data 31 and the stored reference human pose image data 43 yields a match for a given motion representative of a given action within the acceptable return processing procedure, a task compliance count may be increased. If all motions of the acceptable return processing procedure indicate compliance with the procedure for a given garment, the returned goods processing server 40 may increase a respective garment compliance count.

At Block 68, the returned goods processing server 40 generates a notification 45 based upon the comparing at Block 64. The notification 45 may include a percentage of compliance for a given user or across multiple users. The notification 45 may also be based upon individual tasks or motions within the acceptable return processing procedure and/or the entire acceptable return processing procedure for any garment. The notification 45 may, at Block 70, be communicated to a remote device 50, for example, for display thereon.

Figure 5:
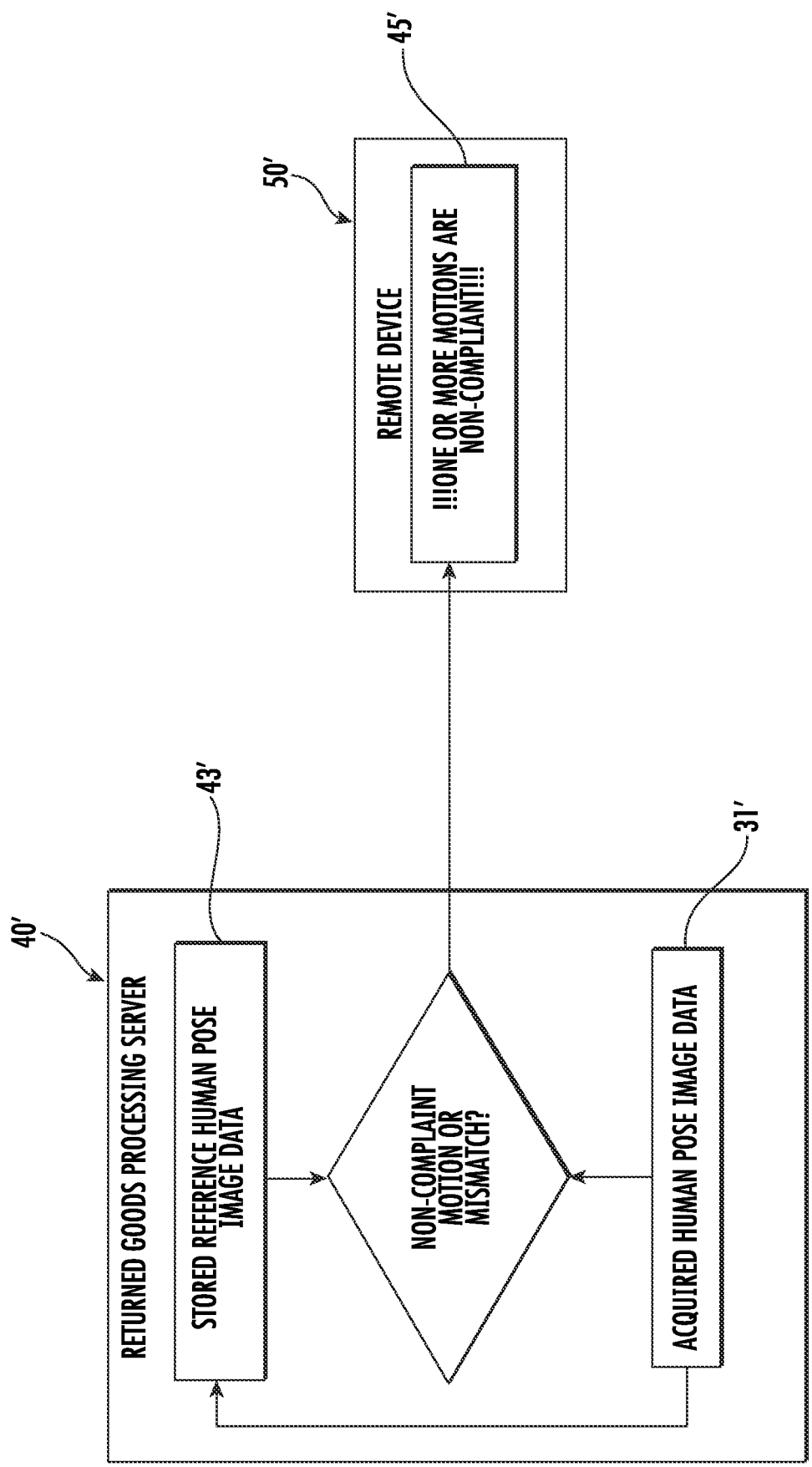
FIG. 5 is a schematic diagram of a portion of a returned goods processing system in accordance with another embodiment.

Referring briefly to FIG. 5, in an embodiment, the returned goods processing server 40' may generate the notification 45' based upon either or both of a non-compliant motion or non-match indicative that one or more motions of the given user are not compliant or that the given user is not following the acceptable return processing procedure. For example, non-compliance may be determined by omission of steps of the procedure, or incorrect motions based upon the comparison of the stored reference and acquired human pose image data 43', 31'. The notification 45' may be communicated to the remote device 50' or the given user, for example, for display thereon.

The returned goods processing server 40 performs machine learning to update the stored reference human pose image data 43 based upon the acquired human pose image data 31 (Block 72). More particularly, the returned goods processing server 40 learns variations in motions as they relate to human poses by way of inputs to one or more of the models described above. For example, if in a given motion such as coupling a hang tag 26, the given user's head generally follows a given movement along with the given user's arms, the returned goods processing server 40 may additionally base the comparison on the head movement. Other and/or additional movements may be learned for updating the stored reference human pose image data 43. Operations end at Block 74.

As will be appreciated by those skilled in the art, the system 20 may be particularly advantageous for identifying deficiencies in returned goods processing. For example, the system 20 may aid in maintaining an increased quality with respect to returns, for example, that may be resold, and in accordance with the acceptable return processing procedure.

A method aspect is directed to a method of processing returned goods. The method includes using a returned goods processing server 40 to obtain human pose image data 31 acquired from a camera 30 while processing a returned item, and store reference human pose image data 43 of sample users while processing returned items. The stored human pose image data 43 is indicative of compliance with an acceptable return processing procedure. The method also includes using the returned goods processing server 40 to compare the acquired human pose image data 31 with the stored reference human pose image data 43 to determine compliance with the acceptable return processing procedure, and generate a notification 45 based upon the comparing. The method further includes using the returned goods processing server 40 to perform machine learning to update the stored reference human pose image data 43 based upon the acquired human pose image data 31.

A computer readable medium aspect is directed to a non-transitory computer readable medium for processing returned goods. The non-transitory computer readable medium includes computer executable instructions that when executed by a processor cause the processor to perform operations. The operations include obtaining human pose image data 31 acquired from a camera 30 while processing a returned item, and storing reference human pose image data 43 of sample users while processing returned items. The stored human pose image data 43 is indicative of compliance with an acceptable return processing procedure. The operations also include comparing the acquired human pose image data 31 with the stored reference human pose image data 43 to determine compliance with the acceptable return processing procedure. The operations further include generating a notification based upon comparing, and performing machine learning to update the stored reference human pose image data 43 based upon the acquired human pose image data 31.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A returned goods processing system comprising:
    a camera configured to acquire human pose image data of a given user while processing a returned item; and
    a returned goods processing server configured to
        store reference human pose image data of sample users while processing returned items, the stored human pose image data indicative of compliance with an acceptable return processing procedure,
        compare the acquired human pose image data with the stored reference human pose image data to determine compliance with the acceptable return processing procedure,
        generate a notification based upon the comparing, and
        perform machine learning to update the stored reference human pose image data based upon the acquired human pose image data.

2. The returned goods processing system of claim 1 wherein the returned item comprises a returned garment.

3. The returned goods processing system of claim 2 wherein the stored reference human pose image data corresponds to human poses for at least one of folding the returned garment, counting fasteners on the returned garment, visually inspecting the returned garment, and coupling a hang tag to the returned garment.

4. The returned goods processing system of claim 1 wherein acquired human pose image data comprises limb joint movement data.

5. The returned goods processing system of claim 1 wherein the returned goods processing server is configured to compare the acquired human pose image data with the stored reference human pose image data based upon an articulated body pose estimation model.

6. The returned goods processing system of claim 1 wherein the human pose image data comprises three dimensional human body pose data.

7. The returned goods processing system of claim 1 wherein the returned goods processing server is configured to communicate the notification to a remote device.

8. The returned goods processing system of claim 1 wherein the notification comprises a percentage of compliance.

9. A returned goods processing server comprising:
    a processor and an associated memory configured to
        obtain human pose image data acquired from a camera while processing a returned item,
        store reference human pose image data of sample users while processing returned items, the stored human pose image data indicative of compliance with an acceptable return processing procedure,
        compare the acquired human pose image data with the stored reference human pose image data to determine compliance with the acceptable return processing procedure,
        generate a notification based upon the comparing, and
        perform machine learning to update the stored reference human pose image data based upon the acquired human pose image data.

10. The returned goods processing server of claim 9 wherein the returned item comprises a returned garment.

11. The returned goods processing server of claim 10 wherein the stored reference human pose image data corresponds to human poses for at least one of folding the returned garment, counting fasteners on the returned garment, visually inspecting the returned garment, and coupling a hang tag to the returned garment.

12. The returned goods processing server of claim 9 wherein acquired human pose image data comprises limb joint movement data.

13. The returned goods processing server of claim 9 wherein the processor is configured to compare the acquired human pose image data with the stored reference human pose image data based upon an articulated body pose estimation model.

14. The returned goods processing server of claim 9 wherein the processor is configured to communicate the notification to a remote device.

15. A method of processing returned goods, the method comprising:
   using a returned goods processing server to
      obtain human pose image data acquired from a camera while processing a returned item,
      store reference human pose image data of sample users while processing returned items, the stored human pose image data indicative of compliance with an acceptable return processing procedure,
      compare the acquired human pose image data with the stored reference human pose image data to determine compliance with the acceptable return processing procedure,
      generate a notification based upon the comparing, and
      perform machine learning to update the stored reference human pose image data based upon the acquired human pose image data.

16. The method of claim 15 wherein the returned item comprises a returned garment.

17. The method of claim 16 wherein the stored reference human pose image data corresponds to human poses for at least one of folding the returned garment, counting fasteners on the returned garment, visually inspecting the returned garment, and coupling a hang tag to the returned garment.

18. The method of claim 15 wherein acquired human pose image data comprises limb joint movement data.

19. The method of claim 15 wherein using the returned goods processing server comprises using the returned goods processing server to compare the acquired human pose image data with the stored reference human pose image data based upon an articulated body pose estimation model.

20. The method of claim 15 wherein using the returned goods processing server comprises using the returned goods processing server to communicate the notification to a remote device.

21. A non-transitory computer readable medium for processing returned goods, the non-transitory computer readable medium comprising computer executable instructions that when executed by a processor cause the processor to perform operations comprising:
   obtaining human pose image data acquired from a camera while processing a returned item;
   storing reference human pose image data of sample users while processing returned items, the stored human pose image data indicative of compliance with an acceptable return processing procedure;
   comparing the acquired human pose image data with the stored reference human pose image data to determine compliance with the acceptable return processing procedure;
   generating a notification based upon the comparing; and
   performing machine learning to update the stored reference human pose image data based upon the acquired human pose image data.

22. The non-transitory computer readable medium of claim 21 wherein the returned item comprises a returned garment.

23. The non-transitory computer readable medium of claim 21 wherein the stored reference human pose image data corresponds to human poses for at least one of folding the returned garment, counting fasteners on the returned garment, visually inspecting the returned garment, and coupling a hang tag to the returned garment.

24. The non-transitory computer readable medium of claim 21 wherein the operations comprise comparing the acquired human pose image data with the stored reference human pose image data based upon an articulated body pose estimation model.

25. The non-transitory computer readable medium of claim 21 wherein the operations comprise communicating the notification to a remote device.

* * * * *